United States Patent
Rasal (10) Patent No.: US 9,199,609 B2
(45) Date of Patent: Dec. 1, 2015

(54) START SYSTEM FOR A MOTOR VEHICLE

(71) Applicant: GM GLOBAL TECHNOLOGY OPERATIONS LLC, Detroit, MI (US)

(72) Inventor: Abuzafor M. Rasal, Hamtramck, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 13/895,830

(22) Filed: May 16, 2013

(65) Prior Publication Data

US 2014/0343755 A1    Nov. 20, 2014

(51) Int. Cl.
*G05D 1/00*    (2006.01)
*B60R 25/20*    (2013.01)

(52) U.S. Cl.
CPC ................................. *B60R 25/2045* (2013.01)

(58) Field of Classification Search
CPC ... F02N 11/0807; B60R 25/209; B60R 25/24; G06F 17/00; G06F 21/31; G07C 9/0039
USPC .................... 701/2, 1, 113; 340/5.72, 426.35; 382/115; 477/5; 903/902; 180/65.265
See application file for complete search history.

(56) References Cited

U.S. PATENT DOCUMENTS

| | | | |
|---|---|---|---|
| 6,498,970 B2 | 12/2002 | Colmenarez et al. | |
| 6,606,492 B1* | 8/2003 | Losey | 455/411 |
| 7,593,000 B1 | 9/2009 | Chin | |
| 8,436,721 B1* | 5/2013 | Lee et al. | 340/426.11 |
| 8,487,753 B1* | 7/2013 | Watts | 340/426.35 |
| 2005/0012593 A1* | 1/2005 | Harrod et al. | 340/5.72 |
| 2005/0208894 A1* | 9/2005 | Conner et al. | 455/41.2 |
| 2006/0186987 A1* | 8/2006 | Wilkins | 340/5.53 |
| 2010/0052851 A1 | 3/2010 | Kaehler | |
| 2010/0085147 A1* | 4/2010 | McCall | 340/5.72 |
| 2010/0185341 A1* | 7/2010 | Wilson et al. | 701/1 |
| 2011/0008668 A1* | 1/2011 | Makidera et al. | 429/144 |
| 2011/0086668 A1 | 4/2011 | Patel | |
| 2011/0181387 A1* | 7/2011 | Popelard | 340/5.2 |
| 2012/0078443 A1* | 3/2012 | Matsubara | 701/2 |
| 2012/0208519 A1* | 8/2012 | Seaver | 455/420 |
| 2012/0306636 A1* | 12/2012 | Tieman et al. | 340/426.24 |
| 2013/0063611 A1* | 3/2013 | Papakipos et al. | 348/207.11 |
| 2013/0125850 A1* | 5/2013 | Liu et al. | 123/179.3 |
| 2013/0219346 A1* | 8/2013 | LeBeau et al. | 715/863 |
| 2013/0259232 A1* | 10/2013 | Petel | 380/270 |
| 2013/0271262 A1* | 10/2013 | Flick | 340/5.72 |
| 2013/0305323 A1* | 11/2013 | Kleve et al. | 726/4 |
| 2014/0156149 A1* | 6/2014 | Feit | 701/49 |

* cited by examiner

*Primary Examiner* — Tuan C. To
*Assistant Examiner* — Shardul Patel
(74) *Attorney, Agent, or Firm* — Dierker & Associates, P.C.

(57) ABSTRACT

A start system includes a vehicle bus system disposed in a motor vehicle. A powertrain control module is connected to the vehicle bus system. The powertrain control module includes an engaged state electrically enabling the powertrain control module to provide tractive power to a vehicle drive wheel, and a disengaged state electrically inhibiting the powertrain control module from providing tractive power to the vehicle drive wheel or another vehicle drive wheel. An authentication system is in communication with the vehicle bus system and with an electronic pattern-entry user interface. The authentication system is responsive to an entered pattern entered on the interface while the powertrain control module is in a current instance of the disengaged state. The powertrain control module enters the engaged state only in response to an authenticated engagement command communicated from the authentication system to the powertrain control module in response to authenticating the entered pattern.

15 Claims, 5 Drawing Sheets

START SYSTEM FOR A MOTOR VEHICLE

TECHNICAL FIELD

The present disclosure relates generally to a start system for a motor vehicle.

BACKGROUND

Some vehicles are started using mechanical keys. Other vehicles are started when an in-vehicle button is pressed while at the same time the presence of a hardware key is detected within the vehicle. Still other vehicles are configured to be started in a variety of different ways. For example, a vehicle may be started with a mechanical key or may be started remotely using a key fob or other electronic device.

SUMMARY

A start system includes a vehicle bus system disposed in a motor vehicle. A powertrain control module is connected to the vehicle bus system. The powertrain control module includes an engaged state electrically enabling the powertrain control module to provide tractive power to a vehicle drive wheel, and a disengaged state electrically inhibiting the powertrain control module from providing tractive power to the vehicle drive wheel or another vehicle drive wheel. An authentication system is in communication with the vehicle bus system and with an electronic pattern-entry user interface. The authentication system is responsive to an entered pattern entered on the interface while the powertrain control module is in a current instance of the disengaged state. The powertrain control module enters the engaged state only in response to an authenticated engagement command communicated from the authentication system to the powertrain control module in response to authenticating the entered pattern.

A method for starting a motor vehicle is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the system and method disclosed herein include and utilize an in-vehicle powertrain control module that is operatively coupled to a smart phone and/or an in-vehicle display. The powertrain control module is electrically inhibited from providing tractive power to one or more vehicle drive wheels when in a disengaged state. To enter an engaged state in which the powertrain control module is electrically enabled to provide tractive power to the vehicle drive wheel(s), a pattern entered using the smart phone or the in-vehicle display is authenticated. If the entered pattern is not authenticated, the powertrain control module will remain in the disengaged state, and the vehicle will be inoperable. As such, the system and method disclosed herein introduce an additional level of authentication when attempting to drive the vehicle.

A pattern, as the term is used herein, is an alphanumeric character(s), a symbol(s) (e.g., regular or irregular shapes, zigzag, etc.), an object(s), or the like that may be entered using the smart phone and/or the vehicle, and may be subsequently authenticated by an electronic component of the vehicle. The pattern may be entered using an interface of the smart phone or vehicle, such as a touchscreen or a camera. In some instances, the pattern may be traced onto a touchscreen, and in other instances, the pattern may be recognized when it is performed as a gesture in front of a gesture zone (e.g., a platform capable of capturing the performed gesture). In still other instances, the pattern may be captured by the camera.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, the term "communication" is to be construed to include all forms of communication, including direct and indirect communication. As such, indirect communication may include communication between two components with additional component(s) located therebetween.

Figure 1:
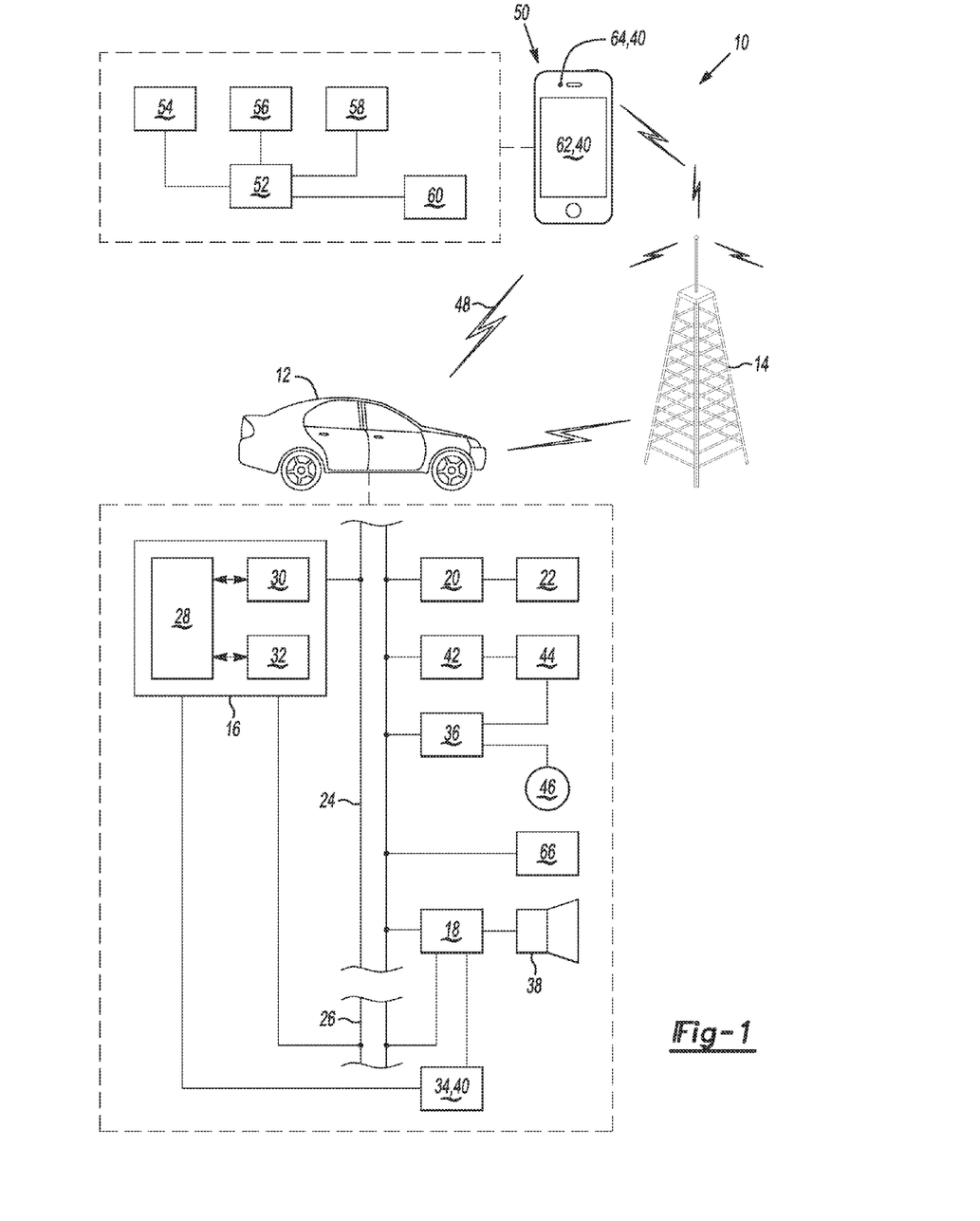
FIG. 1 is a schematic view of an example of a system for starting a motor vehicle.

FIG. 1 depicts an example of a system 10 for starting a motor vehicle 12. The motor vehicle 12 is a mobile vehicle, such as a car, motorcycle, truck, recreational vehicle (RV), boat, plane, etc., and is equipped with suitable hardware and computer-readable instructions/code that enable it to communicate (e.g., transmit and/or receive voice and data communications) over a carrier/communication system and/or using a short-range wireless communication link 48.

In an example, the carrier/communication system is a two-way radio frequency communication system. The carrier/communication system may include one or more cell towers 14. While not shown, it is to be understood that the carrier/communication system may also include one or more base stations and/or mobile switching centers (MSCs) (e.g., for a 2G/3G network), one or more evolved Node Bs (eNodeB) and evolved packet cores (EPC) (for a 4G (LTE) network), one or more service providers including mobile network operator(s), and/or one or more land networks. The carrier/communication system is part of a cellular radio environment, which may include a variety of wireless network providers utilizing the same or a variety of radio access technologies.

The wireless carrier/communication system may be used to establish communication between an in-vehicle telematics unit 16 or an in-vehicle infotainment unit 18 and any outside communications device or system (e.g., a mobile/smart phone 50, a landline telephone, communication component(s) at a call center, etc.). In an example, the in-vehicle telematics unit 16 or the in-vehicle infotainment unit 18 includes a cellular chipset/component that may be an analog, digital, dual-mode, dual-band, multi-mode and/or multi-band cellular phone. The cellular chipset-component uses one or more prescribed frequencies in standard analog and/or digital bands in the current market for cellular systems. Any suitable protocol may be used, including digital transmission technologies, such as TDMA (time division multiple access), CDMA (code division multiple access), and FDMA (frequency-division multiple access). The architecture of the wireless carrier/communication system may be GSM (global system for mobile telecommunications), CDMA2000, UMTS (universal mobile telecommunications system), or LTE (long-term evolution).

Some vehicle communications (e.g., between the vehicle 12 and the smart phone 50 or call center (not shown) utilize radio transmissions to establish a voice channel with the carrier/communication system such that both voice and data transmissions may be sent and received over the voice channel. In some instances, vehicle communications are enabled via the cellular chipset/component for voice communications and a wireless modem for data transmission. In order to enable successful data transmission over the voice channel, wireless modem applies some type of encoding or modulation to convert the digital data so that it can communicate through a vocoder or speech codec incorporated in the cellular chipset/component. It is to be understood that any suitable encoding or modulation technique that provides an acceptable data rate and bit error may be used with the examples disclosed herein.

The in-vehicle telematics unit 16 or an in-vehicle infotainment unit 18 may also be configured for short-range wireless communication technologies, such as BLUETOOTH®, dedicated short-range communications (DSRC), or Wi-Fi. In these instances, the cellular chipset/component may operate in conjunction with a short-range wireless communication unit of the telematics unit 16 or infotainment unit 18. Short-range wireless communications may be suitable for communication between, for example, the unit 16 or 18 and the smart phone 50. Use of short-range wireless communication technologies will depend, at least in part, on the distance of the vehicle 12 from the smart phone 50. Wi-Fi may be more desirable when the distances are slightly longer than those distances for which BLUETOOTH® and dedicated short-range communications (DSRC) are used.

Overall, the in-vehicle telematics unit 16 is an on-board vehicle dedicated communications device that also includes hardware components that are capable of running computer-readable instructions/code, which are embodied on non-transitory, tangible computer-readable media. In any of the examples disclosed herein, the computer-readable media may include any one of many physical media such as, for example, electronic, magnetic, optical, electromagnetic, or semiconductor media. More specific examples of suitable computer-readable media include hard drives, a random access memory (RAM), a read-only memory (ROM), an erasable programmable read-only memory (EPROM), or a portable CD, DVD, or flash drive. Examples of the computer-readable instructions/code operable by the telematics unit 16 may be for verifying an entered pattern or a received pattern code, or for carrying out other steps of the method disclosed herein.

The in-vehicle telematics unit 16 may also provide a variety of services, both individually and through its communication with the call center (e.g., a facility that may be owned and operated by an in-vehicle telematics service provider). Several examples of these services include, but are not limited to: turn-by-turn directions and other navigation-related services provided in conjunction with a GPS based chipset/component; airbag deployment notification and other emergency or roadside assistance-related services provided in connection with various crash and/or collision sensor interface modules 20 and sensors 22 located throughout the vehicle 12; and infotainment-related services where music, Web pages, movies, television programs, videogames and/or other content is downloaded by the infotainment unit 18 operatively connected to the telematics unit 16 via a vehicle bus system 24 and an audio bus system 26. The listed services are by no means an exhaustive list of all the capabilities of the telematics unit 16, but are simply an illustration of some of the services that the in-vehicle telematics unit 16 is capable of offering.

The telematics unit 16 generally includes an electronic processing device 28 operatively coupled to one or more types of electronic memory 30 and a verification module 32. In an example, the electronic processing device 28 is a microprocessor. In other examples, the electronic processing device 28 may be a micro controller, a controller, a host processor, and/or a vehicle communications processor. In another example, electronic processing device 28 may be an application specific integrated circuit (ASIC). Alternatively, electronic processing device 28 may be a processor working in conjunction with a central processing unit (CPU) performing the function of a general-purpose processor. In an example, the electronic processing device 28 is capable of running software programs having computer-readable code/instructions to initiate and/or perform one or more steps of the method disclosed herein.

The electronic memory 30 of the telematics unit 16 may be an encrypted memory that is configured to store authenticated/authorized pattern(s) and computer readable instructions/code to be executed by the processor 28, including instructions of the verification module 32. The verification module 32 includes hardware and computer readable code/instructions embedded on a non-transitory, tangible computer readable medium for verifying a pattern entered on an in-vehicle display 34 and/or a pattern code received at the vehicle 12 from the smart phone 50.

While not shown, it is to be understood that the in-vehicle telematics unit 16 may also include the previously mentioned cellular chipset/component, the previously mentioned short-range wireless communication unit (e.g., a BLUETOOTH® unit), the previously mentioned wireless modem, a navigation unit containing a location detection (e.g., global positioning system (GPS) chipset/component, a real-time clock (RTC), a short-range wireless antenna, and/or a dual mode antenna. Generally, dual mode antenna services the location detection chipset/component and the cellular chipset/component. It is to be understood that the in-vehicle telematics unit 16 may be implemented without one or more of the above listed components (e.g., the real-time clock). It is to be further understood that in-vehicle telematics unit 16 may also include additional components and functionality as desired for a particular end use.

The location detection chipset/component may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection chipset/component may also include, for example, Glonass (i.e., global navigation satellite system), Sbas (i.e., satellite-based augmentation systems), or a D-GPS (differential global positioning system).

The real-time clock (RTC) provides accurate date and time information to the in-vehicle telematics unit 16 hardware and software components that may require and/or request date and time information. In an example, the RTC may provide date and time information periodically, such as, for example, every ten milliseconds.

The telematics unit 16 and the infotainment unit 18 are also operatively connected to the vehicle bus system 24. The vehicle bus system 24 may utilize a variety of networking protocols, such as a controller area network (CAN), a media oriented system transfer (MOST), a local interconnection network (LIN), an Ethernet or TCP/IP, and other appropriate connections such as those that conform with known ISO, SAE, and IEEE standards and specifications, to name a few. The vehicle bus system 24 enables the vehicle 12 to send signals (i.e., real-time bus messages) from the unit 16 and/or 18 to various units of equipment and systems both outside the vehicle 12 and within the vehicle 12 to perform various functions, such as switching a powertrain control module 36 between the engaged and disengaged states, unlocking a door, executing personal comfort settings, and/or the like. The vehicle bus system 24 also enables the vehicle 12 to receive signals at the units 16, 18 from various units of equipment and systems both outside the vehicle 12 and within the vehicle 12.

It is to be understood that the infotainment unit 18 may include any of the communication components previously described and may also include its own electronic processing unit and memory. The infotainment unit 18 includes an audio component that receives analog information, rendering it as sound, via the audio bus system 26. Digital information is received at the infotainment unit 18 via the vehicle bus system 24. The audio component provides AM and FM radio, satellite radio, CD, DVD, multimedia and other like functionality, in conjunction with a controller/processor of the infotainment unit 18. The infotainment unit 18 may contain a speaker system, or may utilize vehicle speaker 38 via arbitration on vehicle bus system 24 and/or audio bus system 26.

The vehicle 12 may also include a display 34. The display 34 may be operatively directly connected to or in communication with the telematics unit 16, and/or may be operatively directly connected to or in communication with the infotainment unit 18. In an example, the display 34 may be used to display navigation instructions to the in-vehicle occupant(s), and may also be used as an electronic pattern-entry user interface 40 for inputting the pattern. Examples of the display 34 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As illustrated in FIG. 1, the vehicle 12 may also include other vehicle systems that are connected to the vehicle bus system 24. Examples of these other vehicle systems may include the crash and or collision sensors 22 and other vehicle sensors 44. The crash sensors 22 provide information to the telematics unit 16 via the crash and/or collision detection sensor interface 20 regarding the severity of a vehicle collision, such as the angle of impact and the amount of force sustained. The other vehicle sensors 44, connected to various sensor interface modules 42, are also operatively connected to the vehicle bus system 24. Examples of the other vehicle sensors 44 include, but are not limited to, key detecting sensors, gyroscopes, accelerometers, magnetometers, emission detection and/or control sensors, lane departure sensors (e.g., video sensors, laser sensors, infrared sensors, etc.), speed sensors, following distance sensors (e.g., radar sensors, video sensors, infrared sensors, ultrasonic sensors, etc.), braking activity sensors, environmental detection sensors, and/or the like. Examples of the sensor interface modules 42 include powertrain control module (shown as reference numeral 36), climate control, body control, and/or the like.

The powertrain control module 36 is operatively connected to at least the vehicle bus system 24 and to one or more vehicle drive wheels 46. The powertrain control module 36 is switchable between the engaged state and the disengaged state. In the engaged state, the powertrain control module 36 is electrically enabled to provide tractive power to the vehicle drive wheel(s) 46. In the disengaged state, the powertrain control module 36 is electrically inhibited from providing tractive power to one or more vehicle drive wheels 46.

As will be described further herein in reference to FIG. 2, the transition between the disengaged state and the engaged state of the powertrain control module 36 may be in response to pattern authentication. For example, when a pattern entered at the vehicle 12 or a pattern code received at the vehicle 12 is authenticated, the powertrain control module 36 may be switched from the disengaged state to the engaged state. It is to be understood that once the powertrain control module 36 is in the engaged state, the module 36 remains in the engaged state until a disengagement condition is recognized. As such, recognition of the disengagement condition causes the powertrain control module 36 to enter the disengaged state. Disengagement conditions may be preset in the memory of the telematics unit 16 and may be recognized by the processor 28.

Examples of the disengagement condition include a deliberate engine off event (e.g., ignition on state to ignition off state, removal of a key), a command received from the in-vehicle user, the park state, or a wireless command received at the vehicle from the call center. As examples of the user command as the disengagement condition, after the vehicle 12 is put into the park state or upon turning off the vehicle engine, a prompt may be displayed to the in-vehicle user (e.g., on display 34 or on a display of his/her smart phone 50) asking the user whether he/she would like to initiate a pattern authentication protocol when the vehicle's next engine on event is recognized. If the user responds yes (e.g., using the appropriate display/screen), the powertrain control module 36 will enter the disengaged state and remain in the disengaged state (i.e., this particular instance of the disengaged state) until an authenticated engagement command is communicated to the powertrain control module 36. As will be described further in reference to the method, the authenticated engagement command may be transmitted in response to an entered pattern or received pattern code being authenticated. As an example of the park state as the disengagement condition, whenever the vehicle 12 is put in park, the disengaged state is automatically entered. As examples of the call center command as the disengagement condition, after a vehicle slow down event is complete and recognized by the call center, a wireless signal may be sent from appropriate equipment at the call center to command the powertrain control module 36 to enter the disengaged state and remain in the disengaged state (i.e., this particular instance of the disengaged state) until the authenticated engagement command is communicated to the powertrain control module 36.

As mentioned above, some examples of the system 10 also include the smart phone 50, such as a GSM/LTE phone or a GSM/CDMA/LTE phone. The smart phone 50 includes physical hardware and software. Some examples of the smart phone 50 components include a processor 52 (which is similar to processor 28), a memory 54, a wireless communications module 56, and a calculation module 58. The processor 52 is configured to run software 60, including computer readable code/instructions stored on the memory 54, and application(s) that are downloaded and stored on the memory 54. The calculation module 58 includes at least computer readable code/instructions embedded on a non-transitory, tangible computer readable medium for creating a pattern code for an initially entered pattern, for calculating a pattern code for an entered pattern, and/or for performing other steps of the methods. The wireless communications module 56 may be used to transmit data (e.g., a pattern code calculated at the smart phone 50) to the vehicle 12 (e.g., using a short-range wireless communication link 48).

The smart phone 50 also includes example(s) of the electronic pattern-entry user interface 40. The electronic pattern-entry user interface 40 may be any interface that can be used to enter the pattern. In an example, the interface 40 of the smart phone 50 is the screen 62. The screen 62 may be a touchscreen that can have a pattern traced thereon. The screen 62 may also or alternatively include sensors that can recognize a hand or facial gesture performed in front of the screen 62. In these instances, the screen 62 functions as the gesture zone. In another example, the interface 40 of the smart phone 50 is the camera 64. The camera 64 may be used to capture an image of an object that has been set as the pattern. The camera 64 may alternatively be the gesture zone, where image recognition is used to capture a hand gesture performed in front of the camera 64. While not shown, it is to be understood that the interface 40 of the smart phone 50 may also or alternatively be a radar that is capable of recognizing the performed gesture.

The smart phone 50 also has a unique identifying code that is used to pair the smart phone with the telematics unit 16 and/or the infotainment unit 18. The smart phone 50 and the telematics unit 16 or infotainment unit 18 are paired when the device 30 and 16 or 50 and 18 exchange unique identifying codes with each other. This enables the telematics unit 16 or infotainment unit 18 and the smart phone to communicate typically under a secured connection. As a more specific example, initial pairing may involve setting the smart phone 50 to a short range wireless discovery mode (such as by selecting, on the phone 50, a discovery mode function as a menu option, icon, or the like). While in the discovery mode, other devices having a short range wireless communication unit (such as the telematics unit 16 or the infotainment unit 18) are allowed to detect the presence of the smart phone 50. When the telematics unit 16 or infotainment unit 18 locates the smart phone 50, the smart phone 50 automatically provides the type of device it is (e.g., a cellular phone) and its short range wireless connection name. The smart phone may then prompt the user to enter a security code/password, and then the unique identifying code of the smart phone 50 is sent to the telematics unit 16 or infotainment unit 18. Upon receiving the unique identifying code, the telematics unit 16 or infotainment unit 18 sends its own unique identifying code to the smart phone 50 to ultimately pair the two devices 16, 50 or 18, 50 together.

Once the two units 16, 50 or 18, 50 have been paired and whenever within short-range wireless communication range of each other, the smart phone 50 can directly communicate with the telematics unit 16 and/or the infotainment unit 18. It is to be understood that the telematics unit 16 and/or the infotainment unit 18 may be capable of connecting to as many as eight different short-range wireless communication devices.

The system 10 also includes an authentication system in communication with the vehicle bus system 24 and with the electronic pattern-entry user interface 40. The authentication system may include different components, depending, at least in part, upon which of the interfaces 40 (e.g., the screen 62, the display 34, the camera 64, etc.) is used. In an example in which the screen 62 or camera 64 is used as the interface 40, the authentication system includes the processor 52 of the smart phone 50, the calculation module 58, the communication module 56, the processor 28 of the vehicle 12, and the verification module 32. In an example in which the display 34 is used as the interface 40, the authentication system includes the processor 28 of the vehicle 12 and the verification module 32.

Figure 2:
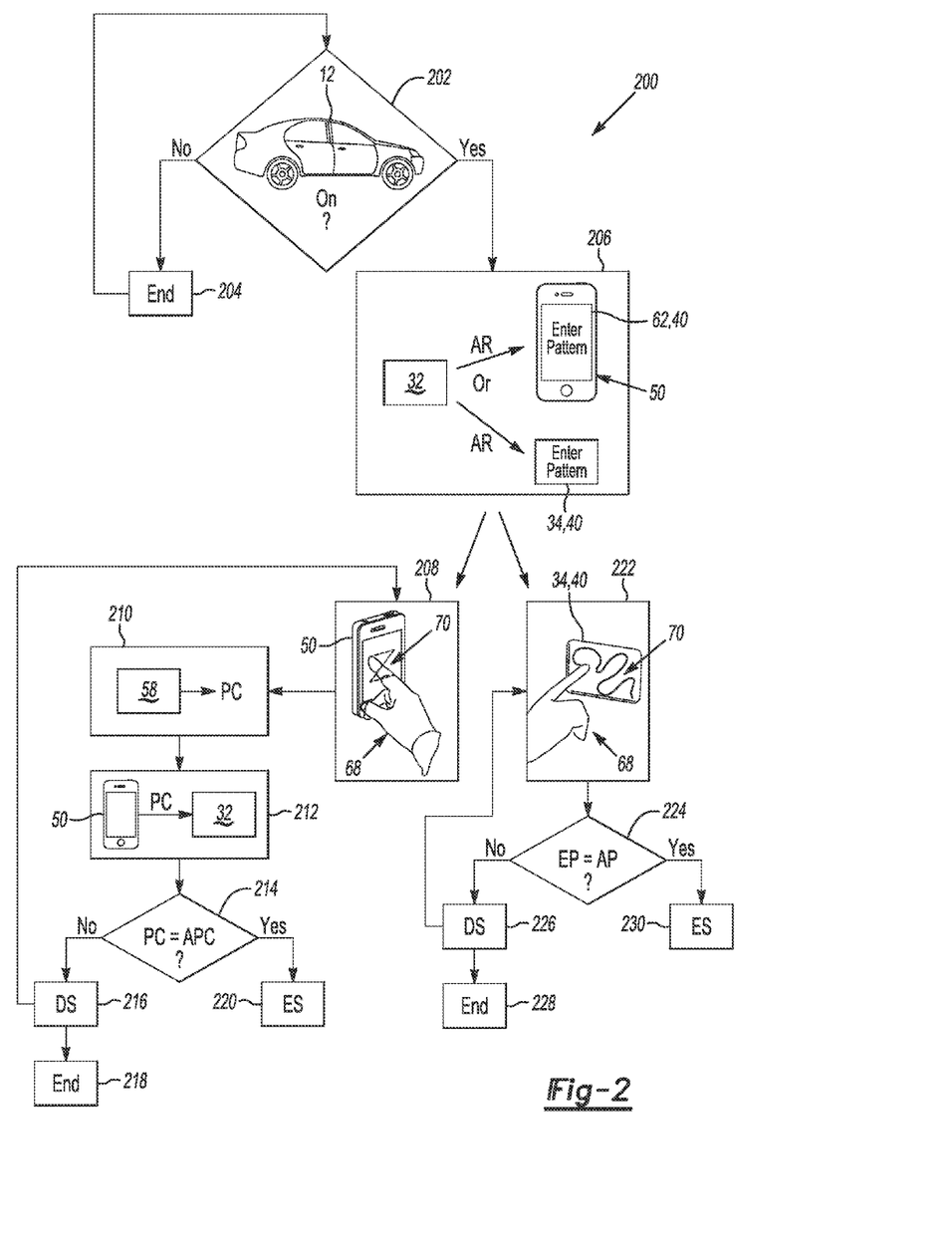
FIG. 2 is a schematic flow diagram illustrating two examples of a method for starting a motor vehicle.

FIG. 2 is a flow diagram illustrating examples of the method for starting a motor vehicle 12 using components of the system 10. The example methods shown in FIG. 2 utilize the system 10 to provide an additional level of authentication before enabling vehicle 12 operation. Each of the methods involves the use of the previously mentioned pattern.

At the outset of any of the method(s) disclosed herein, an authenticated pattern or an authorized pattern code that is associated with an authenticated pattern is generated and stored. These steps are not shown in FIG. 2. In an example, the authenticated pattern and the associated authorized pattern code may be generated using the smart phone 50. In another example, the authenticated pattern may be generated using the in-vehicle display 34. The authenticated pattern or the authorized pattern code may then be stored in the memory 30 of the telematics unit 16 on-board the vehicle 12.

When the smart phone 50 is used, an application (e.g., a vehicle authentication "app" including the calculation module 58) resident on the smart phone 50 may be initiated. The application will prompt the user to create a pattern (e.g., to input an initial pattern). The application may also inquire as to whether the pattern will be a touchscreen pattern, a gesture pattern, or an image pattern. Each of these types of patterns may be associated with allowed parameters, and the application may be configured to inform a user when his/her entered pattern falls outside of the allowed parameters. An allowed parameter associated with the touchscreen pattern may be the number of pattern dots that is possible, depending on the screen 62 and 34 size. An allowed parameter associated with the gesture pattern may be that the gesture be performed within up to 1 meter from the gesture zone. Allowed parameters associated with the camera may vary depending on whether the phone 50 is capable of facial image recognition or body image recognition (e.g., height, figure, etc.).

When the smart phone user indicates to the application that the authenticated pattern will be the touchscreen pattern, the application will prompt the user to input his/her desired pattern on the touchscreen 62. When the smart phone user indicates to the application that the authenticated pattern will be the gesture pattern, the application will prompt the user to perform the gesture in front of the screen 62 or other gesture zone, which is configured to sense the gesture. When the smart phone user indicates to the application that the authenticated pattern will be the image pattern, the application will prompt the user to take a still or motion picture of the object that is to be the subject of the image pattern using the camera 64.

After the initial pattern is entered, the application may prompt the user to accept the initial pattern as the authenticated pattern. If the user does not like the initial pattern or wants to change the initial pattern, he/she may decline to accept the pattern as the authenticated pattern, and may enter another pattern. If the user accepts the initial pattern as the authenticated pattern, the calculation module 58 will generate an authorized pattern code for the authenticated pattern. The authorized pattern code is a unique key that is assigned to and associated with the particular pattern.

The calculation module 58 includes software for authorized pattern code generation. Any suitable technique may be used. The following is an example of generating an authorized pattern code for a pattern that uses the screen 62 as the interface 40. Each point on the screen 62 is assigned a random character. An example of this is shown in Table 1 below.

TABLE 1

| Screen Point | Random Character |
|---|---|
| P1 | Joiads9 |
| P2 | 0934jd |
| P3 | dfj890 |
| P4 | 123456 |
| P5 | Iyodjf |
| P6 | Eht54k |
| P7 | wn3456 |
| P8 | abc123 |
| P9 | 987654 |

When the initial pattern is entered, the points on the screen 62 that are utilized are recorded. For example, the initial pattern may include P7, P5, P2, and P3. The points are concatenated and then replaced with the associated random character. In this example, the authorized pattern code is wn3456Iyodjf0934jddfj890.

The wireless communication module 56 of the smart phone 50 then transfers the authorized pattern code to the verification module 32 in the vehicle 12 using an encrypted transfer. In this example, the smart phone 50 has already been paired with, or then-currently pairs with the vehicle telematics unit 16 or the vehicle infotainment unit 18, thus enabling short-range wireless communications. As such, the encrypted transfer of the pattern code may be accomplished using the short-range wireless communication link 48. It is to be understood that the smart phone application and the verification module 32 may be programmed to operate using corresponding encryption and decryption techniques. Upon sending the authorized pattern code, the smart phone 50 deletes the authorized pattern code from its memory 54. Upon receiving the authorized pattern code, the verification module 32 decrypts the transferred data and saves the authorized pattern code in the memory 30.

The generation and transfer of the authorized pattern code occur one time with any smart phone 50. This is an initialization phase during which the authenticated pattern and its associated authorized pattern code are created. Once the authorized pattern code is transferred to the vehicle 12 and deleted from the smart phone 50, the initialization phase ends.

When the in-vehicle display 34 is used to create the authenticated pattern, an application (e.g., including the verification module 32) resident on the telematics unit 16 may be initiated. This in-vehicle application will prompt the user to create a pattern (e.g., to input an initial pattern using the display 34) that is to be sent to the memory 30 and stored as the authenticated pattern. In this example, the authenticated pattern may be limited to a touchscreen pattern. This type of pattern may be associated with allowed parameters, and the in-vehicle application may be configured to inform a user when his/her entered pattern falls outside of the allowed parameters.

The application will prompt the user to input his/her desired pattern on the display 34. After the initial pattern is entered, the application may prompt the user to accept the initial pattern as the authenticated pattern. If the user does not like the initial pattern or wants to change the initial pattern, he/she may decline to accept the pattern as the authenticated pattern, and may enter another pattern. If the user accepts the initial pattern as the authenticated pattern, the memory 30 will save the authenticated pattern therein.

Referring now specifically to FIG. 2, the method 200 includes recognizing an engine on event of the vehicle 12 (reference numeral 202). The engine on event is the initiation of the vehicle's engine or motor by any suitable mechanism. As examples, the engine/motor may be turned on by actuating a lock with a mechanical key, by detecting the presence of a hardware key within the vehicle 12 (alone or in combination with an in-vehicle button press), or in response to a signal from a key fob. It is to be understood that the engine on event generally requires the mechanical key, the hardware key, the key fob, or some other traditional vehicle starting mechanism. Each of these mechanisms is able to trigger an engine/motor on switch 66 (shown in FIG. 1), which is operably connected to the vehicle bus system 24 and the engine or motor. When a mechanical key is used, the engine on switch 66 is manipulated in response to the starter lock being unlocked with the mechanical key. The unlocking of the starter lock transmits a key present signal to the engine on switch 66. When a hardware key or a key fob is used, one of the sensors 44 recognizes the presence of the hardware key or the key fob signal, and is capable of sending a key present signal to the engine on switch 66. In response, the vehicle engine or motor is turned on.

The engine or motor on event may be recognized by the powertrain control module 26 and the processor 28, which are also operatively connected to the vehicle bus system 24.

When the engine on event is not detected, the method 200 ends, as shown at reference numeral 204, until an engine on event is recognized.

When the engine on event is detected, the method 200 moves to step 206, where an engagement authentication protocol is initiated. It is to be understood that the vehicle 12 may be equipped with a vehicle theft trigger mechanism. If the vehicle 12 detects any sort of theft (e.g., door break in, hotwire to start the vehicle, etc.), then the engagement authentication protocol may be prohibited from starting (even if the engine is successfully turned on).

The engagement authentication protocol includes a series of steps that involve the verification of a pattern that is entered using one of the interfaces 40. The engagement authentication protocol is initiated when the powertrain control module 36 is in the disengaged state (i.e., is unable to provide tractive power). The powertrain control module 36 may be in the disengaged state after the initial set up of the authenticated pattern and/or in response to the previously discussed disengagement condition (e.g., an engine off event, a user command upon vehicle shut down, etc.). The disengaged state of the powertrain control module 36 is recognized by the verification module 32, which, in response, initiates the engagement authentication protocol.

Initiation of the engagement authentication protocol involves the generation of an authentication request AR for transmission to the smart phone 50 or the in-vehicle display 34. The verification module 32 is programmed to select the smart phone 50 or the in-vehicle display 23 to receive the authentication request AR based upon the type of authenticated pattern that is created and saved in the vehicle 12. This is due to the fact that the verification module 32 is involved with the creation of the authenticated pattern. For example, if the verification module 32 initially receives the authorized pattern code from the smart phone 50, the verification module 32 will set the smart phone 50 as the device to be contacted when the engagement authentication protocol is initiated. Similarly, if the verification module 32 is utilized to create the authenticated pattern on the in-vehicle display 34, the verification module will set the in-vehicle display as the device to be contacted with the engagement authentication protocol is initiated.

The authentication request AR is generated by the verification module 32, and includes a request for entry of an instance of the authenticated pattern using one of the interfaces 40. The request may be a message that is to be displayed on the screen 62 or the display 34. As illustrated at reference numeral 206 in FIG. 2, the authentication request AR is transmitted to the smart phone 50 or the display 34 (e.g., via the short-range wireless communication link 48), and the screen 62 or the display 34 displays the request. In the example shown in FIG. 2, authentication request AR includes an "enter pattern" message that is displayed to a user of the smart phone 50 or the in-vehicle display 34. It is to be understood that other messages, including different words messages (e.g., "enter password"), picture messages (e.g., an icon of a key, security guard, etc.) may also be used.

When the smart phone 50 is identified as the device to receive the authentication request AR, the telematics unit 16 or the infotainment unit 18 will attempt to connect to the smart phone 50 over the short-range wireless communication link 48. After the initial pairing, the smart phone 50 will be stored in a list of authorized smart phones in the memory 30. In an example, the telematics unit 16 or the infotainment unit 18 will attempt to simultaneously connect with up to eight phones in the list, or will attempt to sequentially connect with each of the smart phones in the list. During sequential attempts, the telematics unit 16 or the infotainment unit 18 may begin with, for example, the phone on the list that most recently connected to the vehicle 12 or the phone that is marked as the primary phone for the vehicle 12. It is to be understood that once a successful connection is made, further attempts for connection will cease. It is to be further understood however, that if an entered pattern is not authenticated with a preset amount of time (e.g., up to 3 minutes), the telematics unit 16 or the infotainment unit 18 may be programmed to connect to another authorized smart phone 50. In an example, the maximum connection time may be up to one minute and the maximum authentication time may be up to two minutes.

In the example involving the smart phone 50, the user 68 enters a pattern using the screen 62 or the camera 64. An authorized user 68 will know the authenticated pattern, and thus will also know which interface 40 to use to enter this particular instance of the pattern 70. As examples, the authorized user 68 may be a person that set up the authenticated pattern or may be a person that is privy to the authenticated pattern set up by another person. As shown at reference numeral 208, the user 68 is entering a pattern 70 using the smart phone 50.

Figure 3:
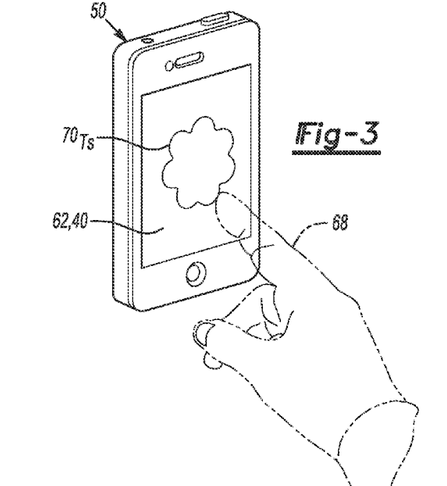
FIG. 3 is a semi-schematic view of an example of a pattern being entered on a touchscreen of a smart phone, where the smart phone touchscreen is an example of an electronic pattern-entry user interface.
Figure 4A:
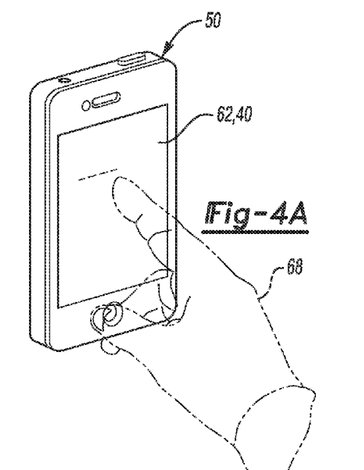
FIGS. 4A through 4C semi-schematically illustrate an example of a gesture pattern being performed in front of an electronic pattern-entry user interface of a smart phone.
Figure 4B:
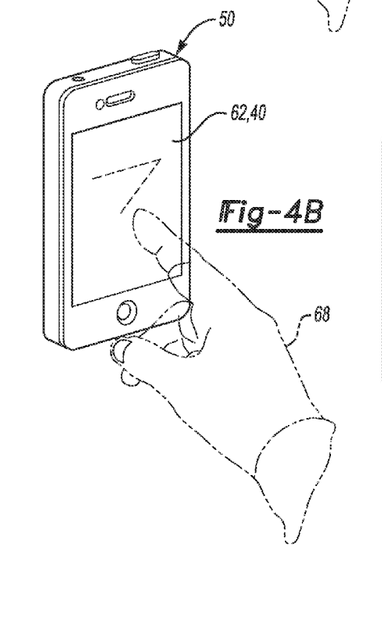
Figure 4C:
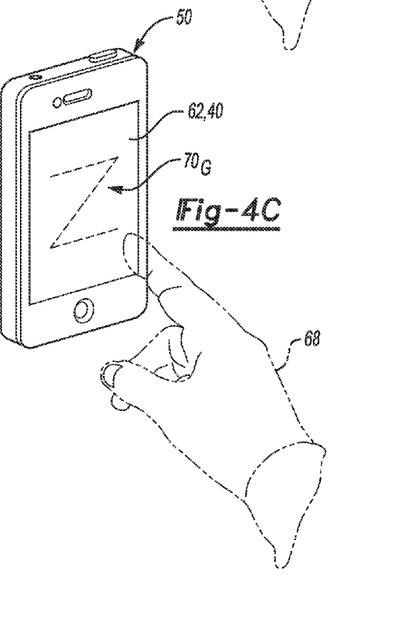
Figure 5A:
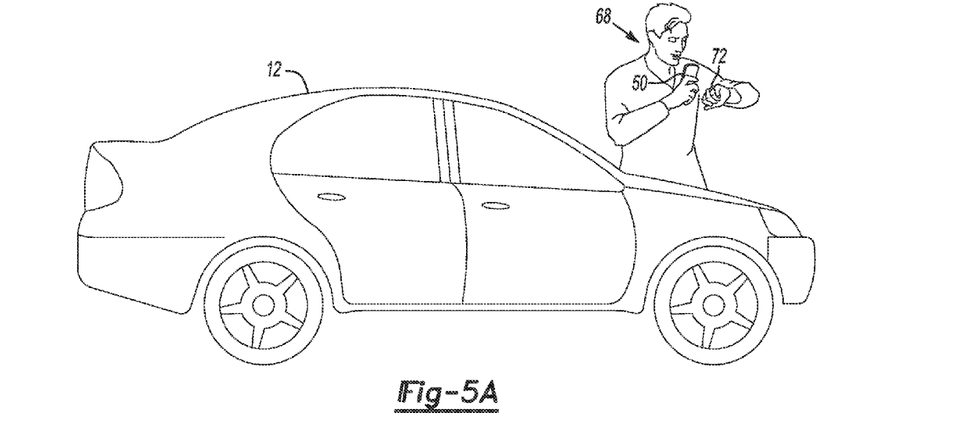
FIG. 5A is a semi-schematic view of an example of a pattern being entered using a smart phone camera, where the camera is yet another example of the electronic pattern-entry user interface.
Figure 5B:
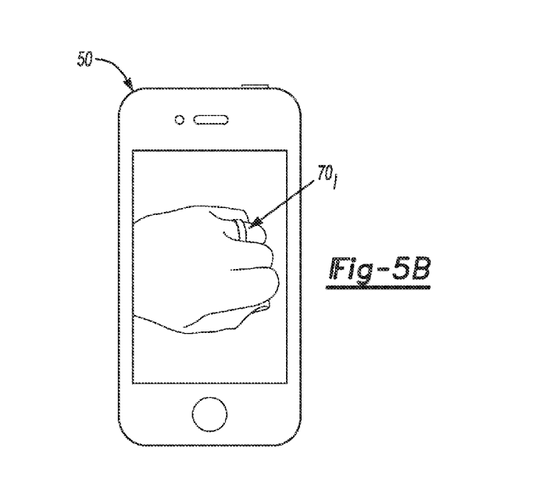
FIG. 5B is a schematic view of the image pattern entered using the smart phone camera of FIG. 5A.

FIGS. 3, 4, and 5A and 5B illustrate the various ways in which the pattern 70 may be entered using the smart phone 50. As shown in FIG. 3, the pattern $70_{TS}$ is a touchscreen pattern that is entered by tracing a replica of the authenticated pattern on the touchscreen interface 62, 40. As shown in FIGS. 4A through 4C, the pattern $70_G$ is a gesture pattern that is entered by reproducing the authenticated pattern in front of the screen interface 62, 40 without making contact with the screen 62. The user 68 performs the gesture, for example, with his/her hand(s), and sensor(s) behind or adjacent to the screen 62 sense the gesture that is made. In these figures, the gesture being made by the user 68 is also shown on the screen 62 of the smart phone 50 for clarity. However, in most instances, the gesture made will simply be recognized by the smart phone 50, and will not appear on the screen as shown in FIGS. 4A through 4C. As shown in FIG. 5A, the user 68 takes a picture, with the camera interface 64, 40, of the object that was used to create the authenticated pattern. As shown in FIG. 5B, the generated image of the object is the entered pattern $70_I$.

Referring back to FIG. 2, after the pattern 70 is entered using some interface 40 of the smart phone 50; the method 200 involves calculating a pattern code PC based upon the entered pattern 70. This is represented at reference numeral 210. The calculation module 58, in conjunction with the processor 52, calculates the pattern code PC. In an example, calculation of the pattern code PC for the entered pattern 70 is performed in the same manner that is used to generate the authorized pattern code for the authenticated pattern. As such, if the entered pattern 70 replicates the authenticated pattern, the pattern code PC for the entered pattern 70 will be the same as the authorized pattern code generated for the authenticated pattern. If the entered pattern 70 does not suitably replicate the authenticated pattern, the pattern code PC for the entered pattern 70 will not match the authorized pattern code. Since the same software (i.e., calculation module 58) is used for the generation of the authorized pattern code and the calculation of the pattern code PC during each verification phase, the calculated pattern code PC will be same as the authorized pattern code as long as the pattern is entered correctly.

As shown at reference numeral 212 of FIG. 2, the pattern code PC calculated for the entered pattern 70 is then transmitted from the smart phone 50 to the vehicle 12. This may be an encrypted transfer using the wireless communication module 56 and the short-range wireless communication link 48. The vehicle bus system 24 receives the encrypted transfer and directs the transmission to the telematics unit 16 or the infotainment unit 18.

The processor 28 (or a processor of the infotainment unit 18) in conjunction with the verification module 32 verifies that the received pattern code PC matches the authorized pattern code (shown as APC in FIG. 2) that is stored in the memory 30 (or in a memory of the infotainment unit 18). The verification module 32 is capable of i) decrypting the encrypted transfer to retrieve the pattern code PC and ii) comparing the received pattern code PC with authorized pattern code(s) APC stored in memory 30. In an example, the authorized pattern code(s) APC may be stored in a look up table that the verification module 32 can use to compare the received pattern code PC with previously stored authorized pattern code(s) APC (i.e., those pattern code(s) specifically generated for authenticated pattern(s).

If a match is not found, the verification module 32 will deny the authentication, and will transmit a signal (over the vehicle bus system 24) to the powertrain control module 36 to remain in the disengaged state (DS as shown at reference numeral 216). In this instance, the vehicle 12 may be running, but the powertrain control module 36 will not be able to provide tractive power to the vehicle drive wheel(s) 46, and thus the vehicle 12 will not be able to be driven. At this point, a user 68 may be prompted to enter the pattern again (taking the user 68 back to step 208). After a predetermined number of authentication attempts, the engagement authentication protocol will time out (reference numeral 218 in FIG. 2) and a user 68 will be unable to operate the vehicle 12, at least until another engagement authentication protocol is initiated and pattern authentication is successfully performed.

If a match is found, however, the verification module 32 will confirm the authentication of the entered pattern by virtue of the matching pattern codes. The verification module 32 will transmit an authenticated engagement command (over the vehicle bus system 24) to the powertrain control module 36 commanding the module 36 enter the engaged state (ES as shown at reference numeral 220). In this instance of the engaged state, the powertrain control module 36 will be able to provide tractive power to the vehicle drive wheel(s) 46, and thus the vehicle 12 may be driven. In this example, the powertrain control module 36 will remain in the engaged state until recognition of a disengagement condition (e.g., a deliberate engine off event, a command from an in-vehicle user, etc.), at which point the powertrain control module 36 will switch back to the disengaged state.

Referring back to step 206 of the method 200 shown in FIG. 2, when the display 34 is identified as the device to receive the authentication request AR, the telematics unit 16 or the infotainment unit 18 will send the authentication request AR to the display 34 using the vehicle bus system 24. In this example, the "enter pattern" message or some other suitable message is displayed to a user 68 via the screen of the display 34, 40.

In the example involving the display 34, the user 68 enters a pattern on the touchscreen of the display 34. The authorized user 68 will know the authenticated pattern, and thus will also know how to enter the pattern 70 using the display 34. As shown at reference numeral 222, the user 68 is entering a pattern 70 using the display 34.

Figure 6:
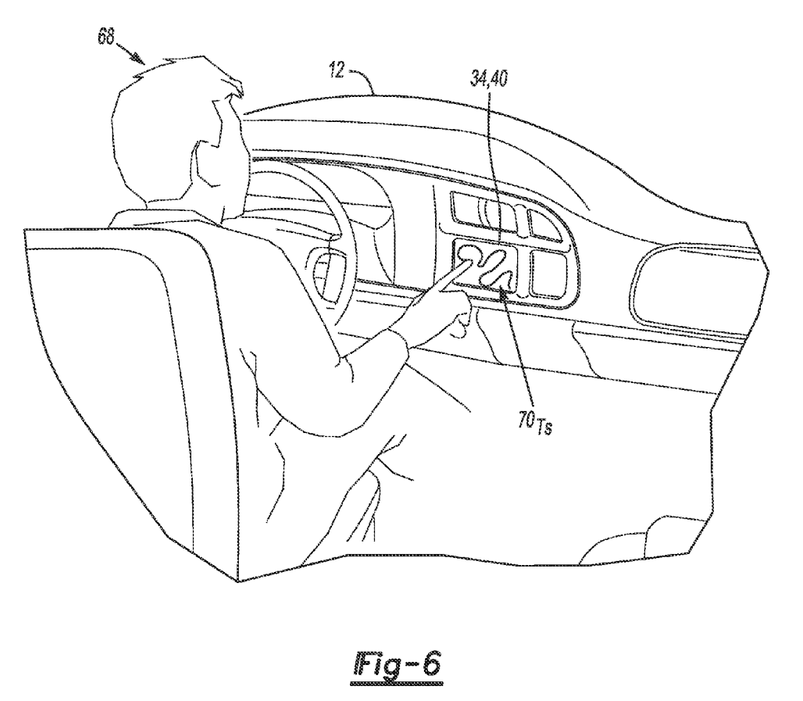
FIG. 6 is a semi-schematic view of an example of a pattern being entered on an in-vehicle display touchscreen, where the in-vehicle display touchscreen is another example of the electronic pattern-entry user interface.

FIG. 6 illustrates an example of the pattern 70 being entered using the display 34. As shown in FIG. 6, the pattern 70$_{TS}$ is a touchscreen pattern that is entered by tracing a replica of the authenticated pattern on the display interface 34, 40.

Referring back to FIG. 2, after the pattern 70 is entered using the display interface 34, 40; the method 200 involves comparing the entered pattern (shown as EP in box 224 of FIG. 2) with the stored authenticated pattern (shown as AP in box 224 of FIG. 2). The processor 28 (or a processor of the infotainment unit 18) in conjunction with the verification module 32 determine whether the entered pattern EP matches one of the authenticated pattern(s) AP stored in the memory 30 (or the memory of the infotainment unit 18). In an example, the authenticated pattern(s) AP may be stored in a look up table that the verification module 32 can use to compare the entered pattern EP with previously stored authenticated pattern(s) AP. The comparison of the entered and authenticated patterns EP, AP allows the verification module 32 to verify, or not, the entered pattern EP as an authenticated pattern AP.

If a match is not found, the verification module 32 will deny the authentication of the entered pattern EP, and will transmit a signal (over the vehicle bus system 24) to the powertrain control module 36 to remain in the disengaged state (DS as shown at reference numeral 226). In this instance, the vehicle 12 may be running, but the powertrain control module 36 will not be able to provide tractive power to the vehicle drive wheel(s) 46, and thus the vehicle 12 will not be able to be driven. At this point, a user 68 may be prompted to enter the pattern again (taking the user 68 back to step 222). After a predetermined number of authentication attempts, the engagement authentication protocol will time out (reference numeral 228 in FIG. 2) and a user 68 will be unable to operate the vehicle 12, at least until another engagement authentication protocol is initiated and pattern authentication is successfully performed.

If a match is found, however, the verification module 32 will confirm the authentication of the entered pattern EP, and will transmit an authenticated engagement command (over the vehicle bus system 24) to the powertrain control module 36 commanding the module 36 to enter the engaged state (ES as shown at reference numeral 230). In this instance, the powertrain control module 36 will be able to provide tractive power to the vehicle drive wheel(s) 46, and thus the vehicle 12 may be driven. In this example, the powertrain control module 36 will remain in the engaged state until recognition of a disengagement condition (e.g., a deliberate engine off event, a command from an in-vehicle user, etc.).

In describing and claiming the examples disclosed herein, the singular forms "a", "an", and "the" include plural referents unless the context clearly dictates otherwise.

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

The invention claimed is:

1. A start system for a motor vehicle, comprising:
   a vehicle bus system disposed in the motor vehicle;
   a powertrain control module connected to the vehicle bus system, the powertrain control module including:
      an engaged state electrically enabling the powertrain control module to provide tractive power to a vehicle drive wheel; and
      a disengaged state electrically inhibiting the powertrain control module from providing tractive power to the vehicle drive wheel or an other vehicle drive wheel;
   an electronic pattern-entry user interface;
   an authentication system in communication with the vehicle bus system and with the electronic pattern-entry user interface, the authentication system being responsive to an entered pattern entered on the electronic pattern-entry user interface while the powertrain control module is in a current instance of the disengaged state;
   a sensor sending a key present signal responsive to detecting a presence of a hardware key or an actuation of a lock by a mechanical key; and
   an engine on switch initiating an engine on event;
   wherein:
      the engine on event is prevented in an absence of the key present signal;
      an engagement authentication protocol is initiated in response to the engine on event;
      the powertrain control module enters the engaged state only in response to an authenticated engagement command communicated from the authentication system to the powertrain control module in response to authenticating the entered pattern; and in response to a disengagement condition, the powertrain control module enters into and remains in an instance of the disengaged state until the authenticated engagement command is communicated from the authentication system to the powertrain control module.

2. The start system as defined in claim 1, further comprising a smart phone that includes the electronic pattern-entry user interface and a unique identifying code.

3. The start system as defined in claim 2, further comprising an infotainment unit or a telematics unit operatively disposed in the motor vehicle and connected to the vehicle bus system, wherein the smart phone is in communication with the infotainment unit or the telematics unit over a short-range wireless communication link.

4. The start system as defined in claim 3 wherein:
the infotainment unit or the telematics unit includes a list of authorized smart phones stored in a memory;
the list includes the unique identifying code for each authorized smart phone; and
the infotainment unit or the telematics unit attempts to establish the short-range wireless communication link with each authorized smart phone after an engine on event is initiated and until the short-range wireless communication link is established.

5. The start system as defined in claim 2 wherein the electronic pattern-entry user interface includes an electronic camera of the smart phone.

6. The start system as defined in claim 1, further comprising an in-vehicle display that includes the electronic pattern-entry user interface.

7. The start system as defined in claim 6 wherein the authentication system includes:
a micro-processor of the motor vehicle; and
a verification module to verify the entered pattern, the verification module including computer readable code, embodied on a tangible, non-transitory computer readable medium, that is run by the micro-processor of the motor vehicle.

8. The start system as defined in claim 7, further comprising an authorized pattern stored in an encrypted memory of the motor vehicle, wherein the verification module is to compare the entered pattern to the authorized pattern to authenticate the entered pattern.

9. The start system as defined in claim 1 wherein the disengagement condition is a deliberate engine off event or a command from an in-vehicle user.

10. A start system for a motor vehicle, comprising:
a vehicle bus system disposed in the motor vehicle;
a powertrain control module connected to the vehicle bus system, the powertrain control module including:
an engaged state electrically enabling the powertrain control module to provide tractive power to a vehicle drive wheel; and
a disengaged state electrically inhibiting the powertrain control module from providing tractive power to the vehicle drive wheel or an other vehicle drive wheel;
an electronic pattern-entry user interface;
an authentication system in communication with the vehicle bus system and with the electronic pattern-entry user interface, the authentication system being responsive to an entered pattern entered on the electronic pattern-entry user interface while the powertrain control module is in a current instance of the disengaged state; and
a smart phone that includes the electronic pattern-entry user interface and a unique identifying code;
wherein:
the powertrain control module enters the engaged state only in response to an authenticated engagement command communicated from the authentication system to the powertrain control module in response to authenticating the entered pattern; and
the authentication system includes:
a micro-processor of the smart phone;
a calculation module to generate a pattern code in response to the entered pattern, the calculation module including computer readable code, embodied on a tangible, non-transitory computer readable medium, that is run by the micro-processor of the smart phone;
a micro-processor of the motor vehicle; and
a verification module to verify the pattern code which is transmitted to the motor vehicle from the smart phone, the verification module including computer readable code, embodied on a tangible, non-transitory computer readable medium, that is run by the micro-processor of the motor vehicle.

11. The start system as defined in claim 10, further comprising an authorized pattern code stored in an encrypted memory of the motor vehicle, wherein the verification module compares the pattern code to the authorized pattern code to authenticate the entered pattern.

12. A method for starting a motor vehicle, comprising:
recognizing an engine on event of the motor vehicle at a powertrain control module in communication with a vehicle bus system operatively disposed in the motor vehicle;
in response to recognizing the engine on event, transmitting an authentication request from a verification module to a device having an electronic pattern-entry user interface;
receiving an entered pattern entered on the electronic pattern-entry user interface;
recognizing, by an authentication system in communication with the vehicle bus system and with the electronic pattern-entry user interface, that the entered pattern is an authenticated pattern; and
in response to the recognizing that the entered pattern is the authenticated pattern, transmitting an authenticated engagement command to the powertrain control module to instruct the powertrain control module to enter into an engaged state, the engaged state electrically enabling the powertrain control module to provide tractive power to a vehicle drive wheel;
wherein the device is a smart phone and wherein the recognizing that the entered pattern is the authenticated pattern includes:
calculating a pattern code in response to the entered pattern, the calculating being accomplished by a calculation module including computer readable code, embodied on a tangible, non-transitory computer readable medium, that is run by a micro-processor of the smart phone;
transmitting the pattern code from the smart phone to a micro-processor of the infotainment unit or the telematics unit; and
verifying the pattern code by a verification module including computer readable code for comparing the pattern code with an authorized pattern code stored in the encrypted memory, the computer readable code for comparing being embodied on a tangible, non-transitory computer readable medium and run by the micro-processor of the infotainment unit or the telematics unit.

13. The method as defined in claim 12, further comprising initializing smart phone authentication by:
- receiving an initial pattern entered on the electronic pattern-entry user interface;
- creating, by the calculation module, the authorized pattern code for the initial pattern;
- transferring the authorized pattern code to the infotainment unit or the telematics units;
- storing the authorized pattern code in the encrypted memory of the infotainment unit or the telematics units; and
- deleting the authorized pattern code from the calculation module.

14. A method for starting a motor vehicle, comprising:
- recognizing an engine on event of the motor vehicle at a powertrain control module in communication with a vehicle bus system operatively disposed in the motor vehicle;
- in response to recognizing the engine on event, transmitting an authentication request from a verification module to a device having an electronic pattern-entry user interface;
- receiving an entered pattern entered on the electronic pattern-entry user interface;
- recognizing, by an authentication system in communication with the vehicle bus system and with the electronic pattern-entry user interface, that the entered pattern is an authenticated pattern; and
- in response to the recognizing that the entered pattern is the authenticated pattern, transmitting an authenticated engagement command to the powertrain control module to instruct the powertrain control module to enter into an engaged state, the engaged state electrically enabling the powertrain control module to provide tractive power to a vehicle drive wheel;
- wherein the device is an in-vehicle display and wherein the recognizing that the entered pattern is the authenticated pattern includes comparing the entered pattern with the authenticated pattern to determine if the patterns match, the comparing being accomplished by a verification module including computer readable code, embodied on a tangible, non-transitory computer readable medium, that is run by a micro-processor of an infotainment unit or a telematics unit operatively disposed in the motor vehicle and connected to the vehicle bus system.

15. The method as defined in claim 14, further comprising initializing in-vehicle display authentication by:
- receiving an initial pattern entered on the electronic pattern-entry user interface; and
- storing the initial pattern as the authenticated pattern in an encrypted memory of the infotainment unit or the telematics units.

\* \* \* \* \*